United States Patent [19]

Basharat

[11] Patent Number: 5,662,342
[45] Date of Patent: Sep. 2, 1997

[54] WHEELED TROLLEY

[75] Inventor: Abdul Majid Basharat, Bristol, England

[73] Assignee: Clares Merchandise Handling Equipment Ltd., Somerset, England

[21] Appl. No.: 504,695

[22] Filed: Jul. 20, 1995

[30] Foreign Application Priority Data

Jul. 21, 1994 [GB] United Kingdom ............ 9414759
Jul. 28, 1994 [GB] United Kingdom ............ 9415248

[51] Int. Cl.⁶ .................................................. B62B 3/14
[52] U.S. Cl. ........................... 280/33.997; 280/47.35; 280/33.994
[58] Field of Search ..................... 280/33.991, 33.996, 280/33.997, 47.34, 47.35, DIG. 3, DIG. 4; D34/21, 22

[56] References Cited

U.S. PATENT DOCUMENTS

| 2,988,175 | 6/1961 | West | 280/47.35 |
| 3,061,049 | 10/1962 | Bramley | 280/47.34 |
| 3,375,018 | 3/1968 | Close | 280/33.991 |
| 4,813,701 | 3/1989 | Balland . | |
| 5,263,726 | 11/1993 | Wood . | |

FOREIGN PATENT DOCUMENTS

| 0 591 964 A1 | 4/1994 | European Pat. Off. . | |
| 46504 | 4/1965 | France | 280/33.997 |
| 48705 | 5/1987 | Germany | 280/33.991 |
| 2176444 | 12/1986 | United Kingdom . | |
| 49112 | 12/1991 | United Kingdom | 280/33.991 |
| 2261637 | 5/1993 | United Kingdom . | |

*Primary Examiner*—Eric D. Culbreth
*Assistant Examiner*—Avraham Lerner
*Attorney, Agent, or Firm*—Hopgood, Calimafde, Kalil & Judlowe L.L.P.

[57] ABSTRACT

A wheeled trolley comprising a base chassis which includes a load support platform and a set of ground-contacting wheel elements which may be swivel castors, and an upright support structure fixed to and projecting upwardly from a rear portion of the base chassis, and surmounted by a push-handle assembly. In one aspect an upwardly open supplementary luggage receptacle is mounted on the rear side of the upright structure to permit the receptacle to be made substantially larger than hitherto without obstructing the main luggage-carrying capacity of the platform. In another aspect, the rear wheel elements are offset rearwardly relative to the back end of the platform to improve stability. In a third aspect the platform is forwardly inclined for ease of stacking and generally lowered for stability and convenience of loading by a rearwardly inclined interconnecting portion of the chassis between the rear end of the platform and the base end of the upright support structure. In a fourth aspect, which is applicable to many different kinds of trolley, the handle assembly has a centre cross-bar spaced rearwardly of the support structure and two side portions projecting upwardly and forwardly from opposite ends of the cross-bar portion to provide for a comfortable double pistol-grip holding action by the user.

18 Claims, 3 Drawing Sheets

WHEELED TROLLEY

This invention relates to a wheeled trolley, particularly, but not exclusively, of the kind used in airports and railway stations by passengers for transporting their luggage from one place to another. This kind of trolley will hereinafter be referred to as a luggage trolley.

Various kinds of luggage trolleys are known, and FIG. 1 of the accompanying drawings illustrates the basic construction of one such known type. The luggage trolley 1 of FIG. 1 comprises a base chassis having mounted to its rear an upright handle support and luggage stop structure 3. The base chassis 2 includes a generally horizontal luggage support platform 4 and a set of swivel castors 5 on which the luggage trolley can be freely moved around. The set of castors comprises a pair of rear castors 5a (or fixed wheels/ castors, not shown), and either a single central front castor 5b, or a pair of front castors 5b, as shown. The upright structure 3 comprises a pair of vertical tubular supports 7 fixed at their lower ends to the rear end of the platform 4 at opposite sides thereof, a flat panel 8 fixed in a vertical position between the upright supports 7, a handle arrangement 9 fixed to and projecting rearwardly from the upper ends of the supports 7 and including a transverse tubular push handle 10, and a forwardly projecting basket 12, commonly of wire mesh construction, mounted near the top ends of the supports 7, for accommodating light luggage items, such as handbags, shoulder bags, etc. and other personal effects such as cameras.

There is commonly provided a braking arrangement including a manually operated braking bar (not shown) located adjacent to the push handle 10 and longitudinally displaceable link rods housed within the tubular upright supports 7, the braking bar being pivotably mounted on the handle assembly 9 so that when it is gripped and squeezed toward the handle 10 it pushes the link rods downwardly to actuate upwardly spring biased brake mechanisms incorporated in the rear castors 5a. The braking assembly can be adapted to be normally in a braking condition and to be released by manual actuation.

The platform 4 is provided with a forward stop 6 to stop luggage falling from the front end of the trolley.

The trolley is adapted to be nested with other identical trolleys. During nesting, the front end of the chassis passes between the uprights 7 beneath the panel 8 of another trolley located in front of the trolley being nested, the platform 4 being constructed and arranged to allow the nesting trolley to be pushed forwardly until the front basket 12 abuts the rear of the upright structure 3 of the trolley in front. This form of trolley suffers from certain operational disadvantages, as will now be explained.

Firstly, a large proportion of passengers are business travellers carrying one or more suitcases and a briefcase. While, for reasons of security, such passengers would normally wish to keep their briefcase close by, the shape and size of the conventional basket 12, and in particular the vertical depth thereof, is insufficient for comfortable accommodation of a briefcase. If the basket were to be made deeper, as illustrated at 12' in FIG. 1 in a vertical direction to provide better accommodation for a briefcase, the vertical clearance between the rear of the platform 4 and the underside of the basket becomes restricted, and in most cases insufficient to accommodate the height of a medium-to-large sized suitcase.

Secondly, in certain operational conditions, the above-described conventional trolley is prone to instability. This problem will be described with reference to FIGS. 2 to 4 of the accompanying drawings.

FIG. 2 schematically illustrates the FIG. 1 trolley loaded with suitcases and with the castors swivelled into their swivel positions adopted automatically when the trolley is being moved rearwardly in the direction R. Although the point of contact P of the rear castors with the ground is forward of the vertical plane of the rear support structure 3, the trolley is generally stable, provided that the surface S on which the trolley is travelling is horizontal. However, when, as shown in FIG. 3, the trolley is being manoeuvred rearwardly down an inclined surface S' or when, as shown in FIG. 4, the trolley is being manoeuvred rearwardly down a step, such as a curb side S" the loaded trolley can easily become unstable, particularly when loaded with only one or two heavy suitcases positioned at the rear of the platform 4. In this situation, the centre of gravity of the loaded trolley is likely to move to a position behind the vertical line V passing through the point of contact P' or P" of the rear castor 5a and the sloping surface S' or the lower horizontal surface at the step S'. It will be understood that in these situations, the trolley becomes unstable and will tend to tip rearwardly. Such instability can create dangerous situations.

In one aspect the present invention seeks to overcome the first of the above-mentioned problems so as to provide enclosed accommodation for a briefcase without vertically restricting the space provided on the platform. According to this aspect of the invention there is provided a trolley comprising a base chassis which includes a load support platform and a set of ground-contacting wheel elements, an upright support structure fixed to and projecting upwardly from a rear portion of said base chassis, a push handle assembly mounted in the region of the upper end of the upright support structure, and an upwardly open supplementary load receptacle mounted on said support structure above the level of the platform, wherein said supplementary load receptacle is mounted on the rear side of said upright support structure.

With such an arrangement, the supplementary load receptacle, which may be in the form of a wire mesh basket, can be made deep enough to accommodate a briefcase without restricting the height available at the rear of the platform for the main luggage, e.g. a suitcase.

In an embodiment according to this aspect of the invention, the receptacle comprises an upright forward wall, a rear wall parallel to and spaced horizontally from said forward wall, a base wall defining the floor of the receptacle, and a pair of opposite side walls, an upper access opening into the receptacle being defined by the upper edges of said front, rear and side walls generally beneath the push handle assembly. To avoid restriction of the entry of a briefcase through the access opening into the receptacle by the push handle, it may be arranged that the plane of the access opening is inclined to the horizontal, with the upper edge of the rear wall lower than the upper edge of the forward wall, the upper edges of the two side walls being correspondingly inclined. With such an arrangement, it is not necessary to lower a briefcase substantially vertically into the receptacle; instead, it can be put into the receptacle from behind the trolley over the top edge of the rear wall.

One or both of the front and rear walls may include a flat panel on which advertisements or other printed material can be provided.

In a second aspect, the invention aims to alleviate the second problem discussed earlier, and to provide a luggage trolley having enhanced stability.

According to this aspect of the invention, there is provided a trolley comprising a base chassis which includes a load support platform and a set of ground-contacting wheel elements, and an upright support structure fixed to and projecting upwardly from a rear portion of the base chassis and surmounted by a push handle, said set of ground-contacting wheel elements including a pair of rear wheel elements mounted at respective opposite sides of said rear portion of the base chassis, wherein said upright support structure defines the rear limit to which the platform may be loaded, said rear limit lying forwardly of the mounting positions of said rear wheel elements.

In a described embodiment, the upright support structure comprises two generally upright tubular support elements attached to opposite sides of the base chassis at the rear end thereof, each of the rear wheel elements being a swivel castor fixed to a base end portion of a respective one of said upright support elements. Each of said support elements is formed above said base end portion with a main upright portion offset forwardly relative to said base end portion by a forwardly projecting intermediate portion, said upright portion having the push handle assembly attached thereto at its upper end.

The intermediate portion may incline forwardly and upwardly to provide the required offset.

The described embodiment incorporates the above-defined first and second aspects of the invention, and includes a supplementary luggage receptacle mounted on the back of the upright support structure. The receptacle is mounted on the back of the main upright portion, and is thereby correspondingly offset forwardly relative to the rear swivel castors, thereby to reduce the destabilising effect of carrying a heavy briefcase on the back of the support structure. Preferably, the base of the basket lies above the intermediate portion of the upright support structure, such that in the swivel position of the rear swivel castors with the trolley supported on a horizontal support surface, the basket lies directly above the points of contact of the rear castors' wheels with said horizontal support surface.

FIG. 5 of the accompanying drawings illustrates schematically a known feature of construction of a luggage trolley which facilitates close stacking. In this construction, the luggage support platform 4 is inclined upwardly toward the front of the trolley so that in the stacked position, it lies on top of the platform of the next trolley in front. During stacking, the front of the platform passes between the two side upright support elements 7' of the trolley in front, and maximum stacking is achieved when the underside of the trolley's platform engages the top of the forward trolley's platform and/or the front of the basket 12 engages the rear of the upright support structure of the trolley in front.

A problem with this structure is as follows. The required angle of inclination $\alpha$ of the luggage support platform relative to the horizontal H necessary to achieve satisfactory stackability is fairly steep, of the order of 10°, and given that the level of the junction J between the rear of the platform and the upright support structure 3 must be sufficient high to enable each of the rear swivel castors to swivel freely through a full 360° about its generally vertical swivel axis, the rise R of the front nose of the platform above the horizontal plane H results in a somewhat excessive overall height h of the front end of the trolley. When, as is often the case, the platform of the trolley is fully loaded right up to its front end with suitcases, the overall centre of gravity of the loaded trolley may be quite high, and this can contribute further to instability in certain operational conditions, e.g. when travelling backwards down a slope or a step. The increased height also makes it more difficult to lift heavy suitcases from the ground level up on to the platform.

In a third aspect, the present invention seeks to alleviate this problem.

According to this third aspect of the invention, there is provided a trolley comprising a base chassis having a load support platform and a set of ground-contacting wheel elements which include a pair of rear wheel elements and an upright support structure fixed to and projecting upwardly from a rear portion of the base chassis and surmounted by a push handle assembly, the load support platform being forwardly and upwardly inclined to permit the trolley to be nested with other identical trolleys so that in the nested position said platform will overlap with the platform of the trolley in front, the base chassis including an interconnecting portion connected to the upright support structure immediately above the rear wheel elements at a first position or positions disposed at a first level, and to the rear of the load support platform at one or more second positions disposed forwardly of the first position or positions at a second level, said second level being lower than the first level.

With this arrangement, the platform is lowered somewhat while complete manoeuvrability is maintained.

In a described embodiment, the rear wheel elements comprise swivel castors, the space beneath the interconnecting portion being sufficient to allow full 360° swivelling of the rear swivel castors.

In a preferred embodiment of the invention, this third aspect of the invention is combined with the second aspect, with the forward offset of the main upper portion of the upright support structure relative to the mounting position of the rear castors corresponding substantially with the forward projection of the interconnecting portion of the base chassis.

The first aspect of the invention may be added to the combination of the second and third aspects to provide enhanced supplementary luggage accommodation, stability and stackability.

In a fourth aspect, the invention aims to provide a trolley with an improved push-handle arrangement.

According to the fourth aspect, the invention provides a trolley comprising a base chassis having a set of ground-contacting wheel elements to provide mobility of the trolley, load support means provided on or by the chassis, and a push-handle assembly mounted at the rear of the trolley, said assembly comprising a push handle which includes a horizontal centre cross-bar portion and two opposite side portions projecting forwardly and upwardly from opposite ends of the centre cross-bar portion to provide for a double pistol-grip holding action by the user.

This arrangement, which is applicable not only to luggage trolleys, but also to other kinds of load-transporting trolley, such as supermarket shopping trolleys, trolleys for use in DIY stores etc, provides the user with a choice between a first pushing action in which he/she holds the central cross-bar portion of the handle, and a second pushing action, which many may find more comfortable, in which he/she holds the two opposite side portions of the push handle with a pistol-grip type hold. In the case of a supermarket shopping trolley, the forward, upper ends of the side portions are connected to opposite sides of the top of the trolley basket at its rear end. In the case of a luggage trolley having a load-supporting platform and a generally upright support structure fixed to and projecting upwardly from a rear portion of the chassis, the forward, upper ends of said side portions are connected to opposite sides of the top of the upright support structure.

When combined with the first aspect of the invention, this handle arrangement of the fourth aspect serves to space the user's gripping position rearwardly from the upright support structure sufficiently to avoid him/her having to stretch forward to avoid knocking into the supplementary load receptacle mounted on the rear side of said upright support structure. The required rearward spacing of the handle can be increased by the provision of two further handle portions each extending forwardly from the forward, upper end of a respective one of said handle side portions and being connected to the upper end of a respective one of two upright support members of the upright support structure.

The handle assembly preferably also comprises a pivotable brake handle shaped correspondingly to the push handle and disposed so to be selectively actuable by gripping a central portion thereof toward the central cross-bar portion of the push handle, or by gripping opposite side portions thereof toward the side portions of the push handle.

A preferred embodiment of the invention will now be described by way of example with reference to FIGS. 6 to 10 of the accompanying drawings.

Figure 6:
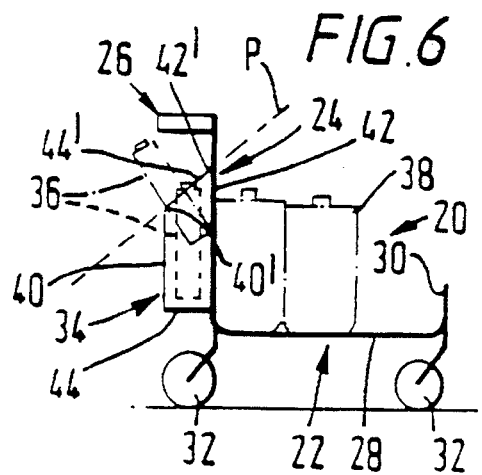
FIG. 6 is a schematic side view of a luggage trolley illustrating the basic concept underlying the first aspect of the present invention.

With reference first to FIG. 6, a luggage trolley 20 incorporating features only of the first aspect of the invention includes a base chassis 22 and a rear upright support structure 24 fixed to and projecting upwardly from the rear of the chassis 22, and surmounted by a push handle assembly 26. The base chassis 22 comprises a platform 28 provided with a front luggage stop 30, and a set of ground-contacting wheel elements in the form of swivel castors 32, a pair of which is mounted underneath the rear end of the chassis, one or a further pair of castors being mounted underneath the front end of the chassis. A supplementary luggage receptacle 34 is attached to the rear of the upright support structure 24 beneath the push handle assembly 26, this receptacle 34 being dimensioned so as to accommodate a briefcase 36.

As illustrated in FIG. 6, by providing the receptacle 34 on the back of the structure 24, the space on the platform 22 to accommodate larger items of luggage such as suitcases 36 remains vertically unrestricted by the increased height of the receptacle necessary in order to provide accommodation for the briefcase.

It will be seen from FIG. 6 that vertical access into the receptacle 34 is obstructed in this embodiment by the push handle 26 located above it. To enable a briefcase 36 to be easily put into this receptacle 34 from the rear of the trolley, the receptacle is formed so that its access opening is in a rearwardly inclined plane P. This plane is defined by the upper edge 40' of a rear wall 40 and the upper edge 42' of a front wall 42, and two inclined upper edges 44' of two opposite side walls 44 of the receptacle 34 also lie in this plane. With this arrangement the briefcase 36 can enter the receptacle 34 at an angle, as shown, over the top edge 40' of the rear wall 40.

With reference now to FIGS. 7 to 10 of the drawings, a preferred embodiment is illustrated which incorporates all four above-defined aspects of the present invention.

Figure 8:
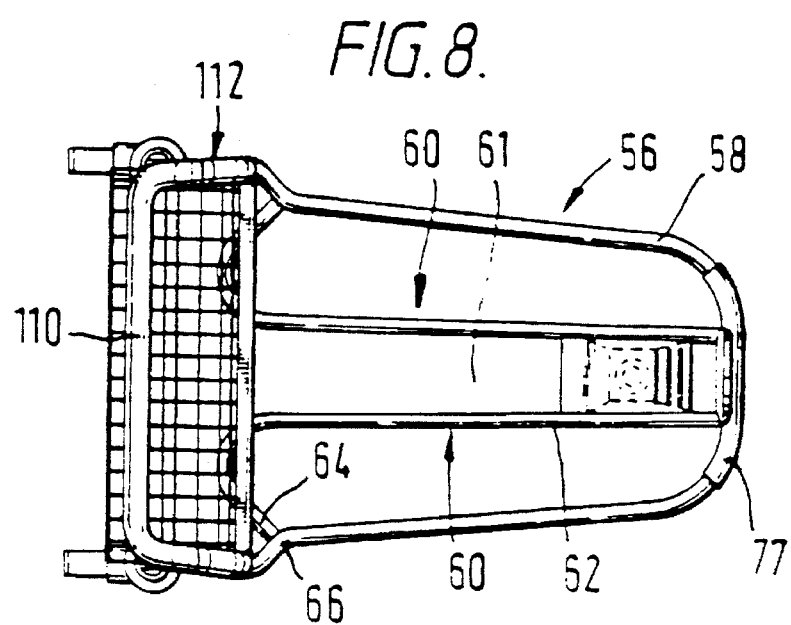
FIG. 8 is a top plan view of the trolley shown in FIG. 7.

The trolley 50 comprises a base chassis 52 and a generally upright support structure 54 fixed to and projecting upwardly from the rear end of the base chassis 52. The base chassis 52 includes a platform portion 56 which is formed, as illustrated in FIG. 8, by a generally U-shaped outer frame section 58 and a pair of inner frame sections 60 lying in the same plane as the outer frame section 58, and each comprising a longitudinally extending forward part 62, and a rear, forwardly and outwardly projecting part 64 welded at its outer end to the inside of the outer frame section 58 at a position 66 at which that outer frame section 58 is bent outwardly. A longitudinal central gap 61 is defined by and between the forward parts 62 of the inner frame sections, and serves to assist trolley stacking, as will be described later.

Steerable mobility for the trolley is provided by a set of swivel castors, including a pair of rear swivel castors 68, and a single central forward swivel castor 70. The forward swivel castor 70 is mounted in the base of a generally U-shaped swivel support 72 formed from bent metal plate or strip and fixed between the forward parts 62 of the inner frame sections 60 toward the front end of the platform. The front end 74 of the strip or plate forming the swivel support 72 is bent so as to project upwardly from the front end of the platform and is covered by a central part of a moulded plastic nose piece 76, which also includes side portions 77 fitting over the front of the side frame portion 58, to form a front buffer and luggage stop 78.

The rear swivel castors 68 are mounted in the base end of two tubular generally upright support elements 80 which are fixed in the region of their said base ends to the rear ends of respective interconnecting members 82 of the base chassis 52. These rear swivel castors 68 are of the kind incorporating a spring biased brake mechanism including an actuating spigot 84, each castor 68 being mounted with its spigot 84 located in the base end of the corresponding support member 80.

The interconnecting members 82 are constituted by rear portions of the outer frame sections 58, located rearwardly of the bend positions 66. The outer frame sections 58 and these interconnecting members 82 are integrally formed by appropriately bending a single length of oval section tubing.

Figure 5:
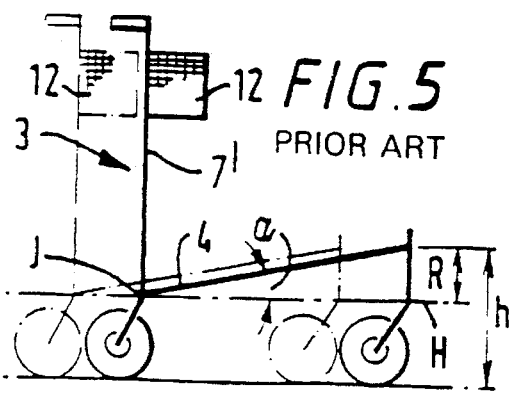
FIG. 5 is a schematic side view illustrating the features of another known luggage trolley.
Figure 7:
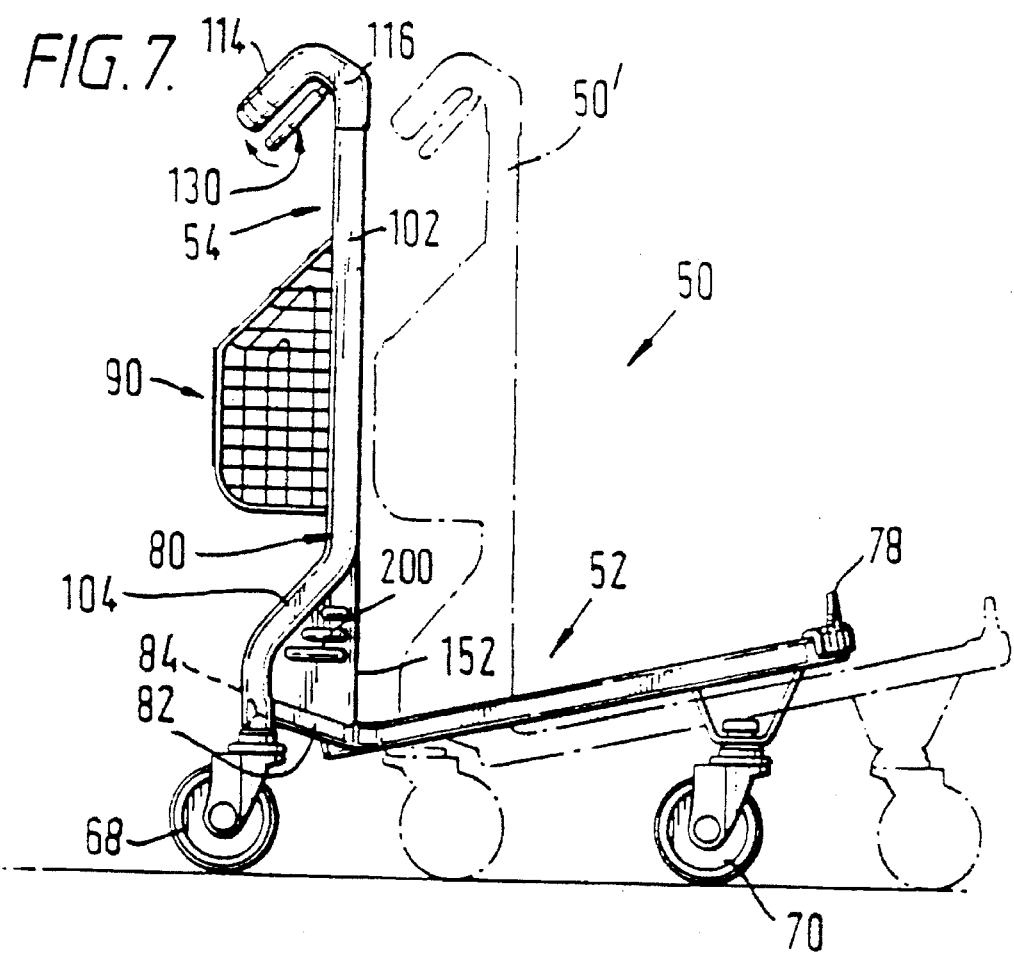
FIG. 7 is a side view of a luggage trolley incorporating features according to all four aspects of the present invention.
Figure 9:
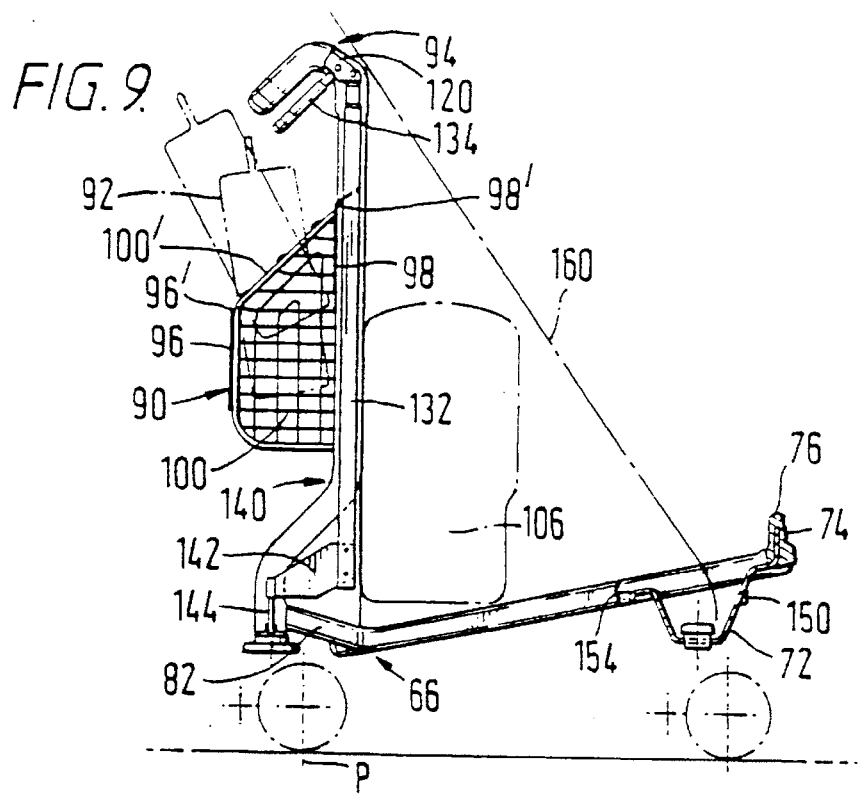
FIG. 9 is a side elevational view corresponding to FIG. 7, showing the trolley with certain parts omitted or broken away to illustrate internal components.

As can be seen from FIGS. 7 and 9, each of the interconnecting portions 82 is inclined downwardly from its position of fixing to the base of the respective upright support member 80 to the position 66 at which it joins the platform 52, and from this position 66, the platform is inclined upwardly toward its front end. As explained earlier with reference to FIG. 5, and as illustrated by the phantom outlined further, identical trolley 50' in FIG. 7, this upward inclination of the luggage support platform permits close stacking of the trolleys, as will be explained more fully hereinafter.

As a result of this downward inclination of the interconnecting members 82, the level of the rear end of the platform (generally at the longitudinal position of the bends 66) is lower than the level at which the interconnecting members 82 are joined to the upright support members 80. The platform is therefore somewhat lower than it would have been if the interconnecting members had been formed to lie in the same inclined plane as the platform 52. Nevertheless, sufficient space remains beneath the interconnecting members 82 to enable the rear swivel castors 68 to swivel fully through 360° as can be seen by reference to FIG. 7, which shows the rear castors swivelled for forward travel of the trolley, and FIG. 9, which shows them swivelled for reverse travel.

The trolley is provided with a supplementary luggage receptacle, in the form of a basket 90, and as in the embodiment of FIG. 6, this basket 90 is fixed on the rear side of the upright support structure 54. As shown in FIG. 9, this basket is made sufficiently deep to accommodate a briefcase 92, and to this end extends substantially fully widthwise across the support structure 54.

The rear support structure 54 is surmounted by a generally rearwardly projecting handle assembly 94. The purpose of the general rearward projection of the handle assembly 94 is to permit the user to grasp the handle at a position which avoids him/her having to stretch forwardly to avoid knocking against the rearwardly projecting basket 90. Accordingly, the handle assembly 94 is disposed generally directly above the basket.

To avoid obstruction of the entry of a briefcase into the basket 90, the latter is constructed so as to have a generally rearwardly inclined access opening which permits the briefcase 92 to be put into the basket in an inclined orientation, as best illustrated in FIG. 9. To form this inclined access opening, the basket is constructed similarly to the embodiment of FIG. 6. More particularly, it has a rear wall 96 of which the horizontal upper edge 96' is somewhat lower than a horizontal upper edge 98' of a forward wall 98 of the basket. The basket has two opposite side walls 100 of open mesh constructions, the upper edges 100' of which incline upwardly in a forward direction from the level of the rear wall edge 96' to the level of the forward wall edge 98'. The plane of the access opening is defined by the edges 96' and 98' and also contains the edges 100'.

Figure 10:
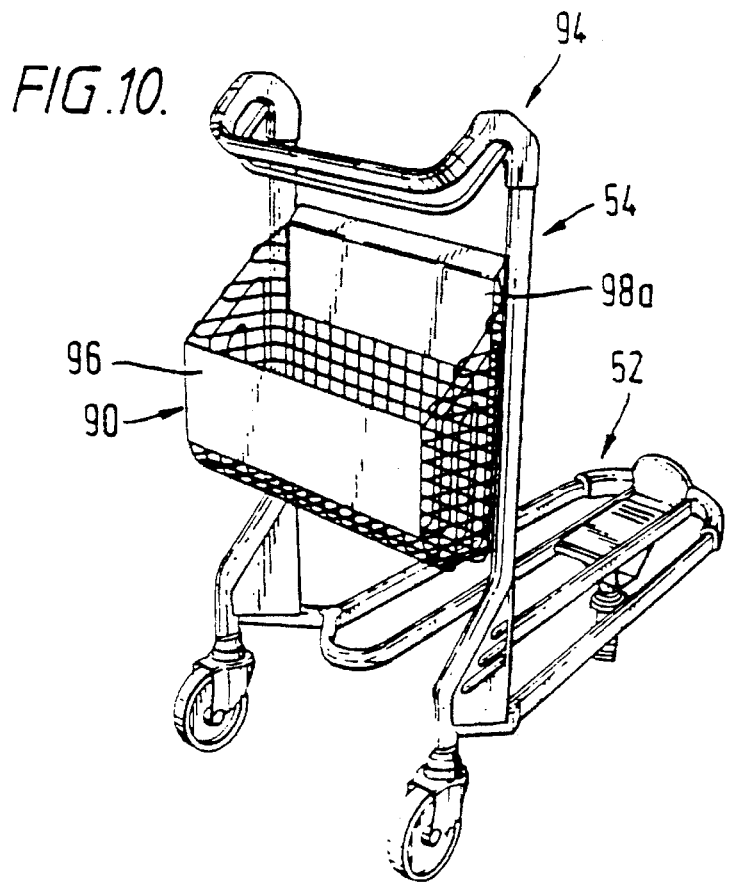
FIG. 10 is a rear perspective view of the trolley shown in FIGS. 7 to 9.

As best seen in FIG. 10, the rear wall 96, and an upper part 98a of the forward basket wall are formed by respective flat panels which can carry advertising material, or instructions/directions for the user of the trolley.

In accordance with the second aspect of the invention, the luggage trolley of this embodiment is formed so that the rearmost part of the platform 52 usable for luggage support, lies forwardly of the mounting position of the rear castors 68. The longitudinal position of this rearmost loading point (i.e. the back end of the platform 52) is defined by the position of upper main portions 102 of the two upright support members 80. These portions 102 are offset forwardly relative to the base ends of the members 80 to which the swivel castors 68 are fixed, by intermediate offsetting portions 104, inclined forwardly and upwardly relatively to the base ends. Stated differently, the swivel axes of the rear castors 68 are offset rearwardly relative to the back end of the platform.

By means of this offset the position at which the rearmost luggage item, such as a suitcase 106, can be loaded onto the platform 52 is displaced forwardly relative to the mounting positions of the rear swivel castors 68, so that even when these rear swivel castors are swivelled to their positions, as shown in FIG. 9, for rearward travel of the trolley, all of the loaded luggage is kept well forward of the ground contact position P of the swivel castors when on a level surface. Accordingly, the angle through which the trolley must be rearwardly tipped before an unstable condition arises (i.e. in which the loaded trolley's centre of gravity lies behind the contact point P) is considerably greater than in the prior art trolleys.

The supplementary luggage receptacle 90 is mounted behind the upper main portions 102, so that the above-mentioned forward offset also minimises or avoids any destabilising effect due to a heavy briefcase 92 placed in the receptacle 90.

Figure 1:
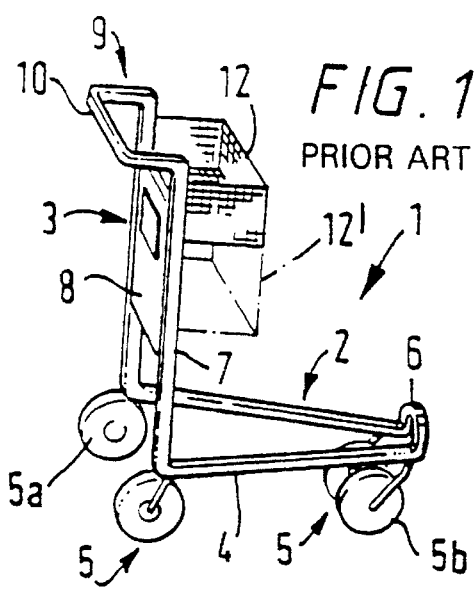
FIG. 1 is a side perspective view illustrating the basic features of a known luggage trolley.
Figure 2:
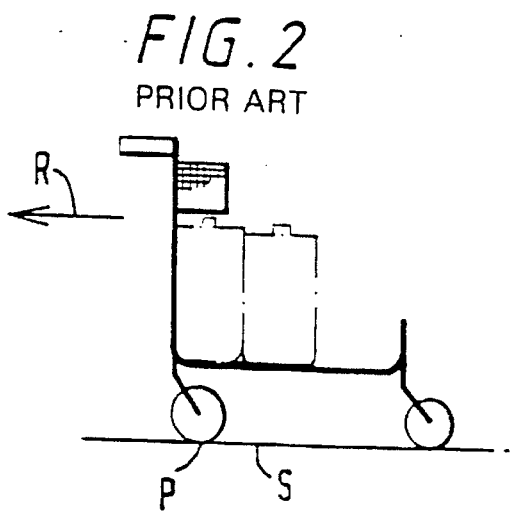
FIGS. 2 to 4 are schematic side elevational views of the known luggage trolley in different operational positions.
Figure 3:
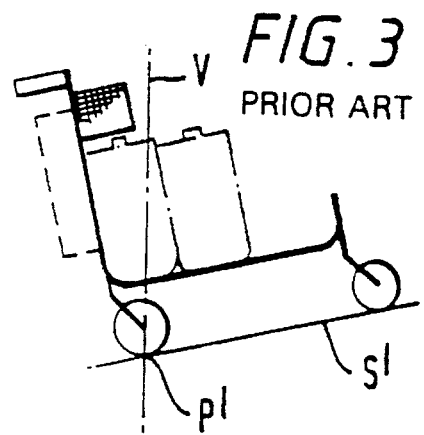
Figure 4:
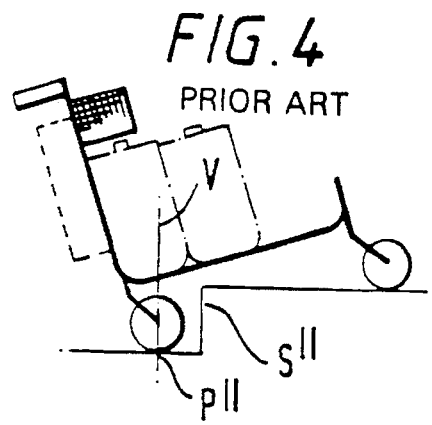

It will be understood from FIGS. 3 and 4 that the most dangerous loading arrangement tending to rearward-tipping instability occurs when there is a single large suitcase placed at the back end of the platform, and when a heavy briefcase is loaded into the supplementary load receptacle (the latter is shown in phantom in FIGS. 3 and 4 simply to illustrate how mounting the receptacle on the back rather than the front of the upright support structure 24 in an otherwise conventional trolley can lead to increased instability in certain circumstances). However, the above-described arrangement in the FIG. 7 to 10 embodiment of the invention overcomes this problem because the forward offset of the main upper portions 102 of the support elements 80 serves to displace the rearmost luggage (both on the platform 52 and in the receptacle 90) forwardly relative to the rear swivel castors 68.

The handle assembly 94 surmounting the upright support structure 54 comprises a horizontal centre cross-bar handle portion 110 and two opposite side handle portions 112 which are attached to the top ends of the support members 80 and which serve to space the cross-bar handle portion 110 rearwardly of the upright support structure 54. Each of these side portions 112 comprises a forwardly and upwardly extending handle portion 114 which is so angled and dimensioned as to provide a comfortable "pistol-grip" handle, which provides better steering control of the trolley by the user than manoeuvring by gripping the cross-bar handle portion 110. A further, forwardly and downwardly inclined portion 116 connects the top end of the pistol-grip portion 114 to the top of the respective upright support member 80. As best seen in FIG. 8, the side portions 112 are angled slightly outwardly from the outer ends of the cross-bar handle portion 110, again for maximum comfort.

Conveniently, the cross-bar handle portion 110 and the pistol-grip portions 114 are integrally formed from a single length of hollow tubing, suitably bent near its opposite ends, the free ends of the tube portions forming the portions 114 being riveted, welded or otherwise fixed to brackets 120 (see FIG. 9) which are in turn fixed to the upper ends of the support members 80. These metallic components of the handle assembly are covered by moulded plastic elements for comfort and visual appeal.

This form of handle assembly can also be used with other kinds of load-transporting trolley, such as supermarket shopping trolleys in which an upwardly open wire mesh basket is mounted on a wheeled base chassis. With such a shopping trolley, the side portions 112 are attached to opposite sides of the top of the trolley basket at its rear end.

As the parts of the handle intended to be gripped by the user (i.e. the cross-bar portion 110 and the pistol-grip portions 114) are spaced rearwardly of the rear upright support structure 54 in the described embodiment, the user is prevented from having to stretch forwardly to avoid knocking against the rearwardly projecting receptacle 90.

The handle assembly is preferably also provided with a brake handle 130 formed from metal tubing bent into a shape corresponding to the handle portions 110/114, and clad with plastic sleeving for comfort. This brake handle 130 is positioned underneath the handle 110/114, and is pivotally attached to the handle mounting bracket 120, so that it can be gripped toward the push handle to apply braking to the trolley. A brake linkage coupling brake actuation from the brake handle 130 to the brake actuating spigot 84 of each rear swivel castor 68 comprises, in respect of each rear castor, a link rod 132 attached to the forward end of a respective side portion 134 of the brake handle 130, at an attachment position lying forwardly of the position of pivot to the handle attachment member 120, the link rod 132 extending vertically within the hollow tube forming the upper portion 102 of the corresponding support member 80. The lower part of this link rod 132 projects through an aperture formed on the underside of the bend 140 between the offsetting intermediate portion 104 and the lower end of the upper portion 102 of the corresponding support member 80. The lower end of the link rod 132 therefore lies outside the tube forming the member 80, beneath this bend 140, and is attached to a rearwardly projecting link plate 142 a rear portion of which re-enters the upright member 80 at a position near its base end immediately above the swivel mounting of the swivel castor 68. A further link element 144 projects downwardly from the rear internal end of the link plate 142 to actuate the upwardly spring-biased castor actuating spigot 84 when the link rod 132 and plate 142 move downwardly on application of the brake.

The elements of the brake linkage (i.e. the lower end of the link rod 132 and the major portion of the link plate 142) lying outside the support member 80 are concealed by a plastic moulded shield 150 which fills the generally triangular gap formed beneath the offsetting intermediate portion 104. The vertical forward edges 152 of the shields 200 extend in line with the forward edges of the main upper portions 102 of the upright members 80 to provide a continuous vertical engagement surface against which the rearmost luggage item on the platform 52 can lean.

The above-described braking mechanism serves to brake the trolley on gripping of the brake handle (i.e. a normally-OFF action). The mechanism can be suitable adapted, if required, so that gripping of the brake handle releases the brake (i.e. a normally-ON action).

Thus, it will be understood that the above-described luggage trolley according to the present invention has improved luggage accommodation, in that it permits secure stowing of a briefcase without reducing the main luggage loading capacity, has improved stability against rearward tipping, and has an improved push handle arrangement.

Stacking of the trolley with another identical forward trolley is achieved by guiding the front end of the platform 52 between the lower ends of the support members 80 of the trolley in front, and pushing the trolley forwardly. The downwardly projecting front castor support 72 enters and moves along the central gap 61 of the platform of the front trolley and the platform 52 moves forwardly to overlap that of the forward trolley. The nesting movement stops when a plastic buffer 150 fixed to the forwardly facing surface of the front castor support member 72 abuts against a rear downwardly-turned edge 154 of the castor support member 72 of the forward trolley. It is arranged that this abutment occurs and nesting therefore stops, just before the upright support members 80 would impact against the rear wall 96 of the supplementary luggage receptacle of the forward trolley.

The space between the centre portion parts of the inner platform sections 60 overlying the front castor support member 72 can, if desired, be covered with a rectangular plastic moulded cover element (not shown). However, the recess provided by the U-shape of this member 72 provides a useful location point for elongate luggage items, such as skis 160, which can be loaded onto the trolley as illustrated in FIG. 9, with rear portions thereof resting on the handle assembly.

In the described embodiment, the rear wheel elements comprise swivel castors. It will be appreciated that the trolley may be fitted instead with directionally-fixed rear wheels/castors and still provide, according to the respective aspect of the invention, the advantage of improved luggage accommodation, stability or handling.

I claim:

1. A trolley comprising a base chassis which includes a load support platform and a set of ground-contacting wheel elements, an upright support structure fixed to and projecting upwardly from a rear portion of said base chassis, a push-handle assembly mounted in the region of the upper end of the upright support structure, and an upwardly open supplementary load receptacle mounted on said support structure above the level of the platform, wherein:

a) said set of ground-contacting wheel elements includes a pair of rear wheel elements mounted at respective opposite sides of said rear portion of the base chassis;

b) said upright support structure includes a base portion and a main upper portion which is offset forwardly relative to said base portion;

c) said rear wheel elements are mounted at respective mounting positions to said base portion of said upright support structure;

d) said main upper portion defines the rear limit to which the load support platform may be loaded, said rear limit lying forwardly of the mounting positions of said rear wheel elements;

e) said load support platform is upwardly inclined in the forward direction to permit the trolley to be nested with other identical trolleys so that in the nested position said platform will overlap with the platform of the trolley in front;

f) said supplementary load receptacle is mounted on the rear side of said main upper portion of said upright support structure and wherein g) the base chassis includes an interconnecting portion connected to the upright support structure immediately above said pair of rear wheel elements at a first position or positions disposed at a first level, and to the rear of the load support platform at one or more second positions disposed forwardly of the first position or positions at a second level, said second level being lower than the first level.

2. A trolley according to claim 1, wherein the receptacle comprises an upright forward wall, and a rear wall parallel to and spaced horizontally from said forward wall, an upper access opening into the receptacle being defined by the upper edges of said front and rear walls generally beneath the push-handle assembly, the upper edge of the rear wall being lower than the upper edge of the forward wall, so that the plane of said access opening is inclined to the horizontal.

3. A trolley according to claim 2, wherein said receptacle further comprises a pair of opposite side walls each extending between one end of the rear wall and the corresponding end of the forward wall and each having an inclined upper edge lying in said access opening plane.

4. A trolley according to claim 2, wherein one or both of the front and rear walls includes a flat panel.

5. A trolley according to claim 1, wherein said upright support structure includes a forwardly projecting, inclined intermediate portion between said base portion and said main upper portion, to form the forward offset, said supplementary load receptacle lying above said intermediate portion.

6. A trolley according to claim 1, wherein said upright support structure comprises a pair of upright tubular members attached to said rear portion of said base chassis at opposite sides thereof, said pair of rear wheel elements being mounted to base parts of the respective said upright tubular members.

7. A trolley according to claim 5, wherein said support structure comprises a pair of generally upright integrally formed tubular members attached to said rear portion of said base chassis at opposite sides thereof, said tubular members each having base, upper and intermediate parts, said pair of rear wheel elements being mounted to said base parts of the respective tubular members, said upper parts forming said main upper portion of the upright support structure, and said intermediate parts forming said forwardly projecting inclined intermediate portion of said upright support structure.

8. A trolley according to claim 1, wherein said rear wheel elements comprise swivel castors, the space beneath said interconnecting portion being sufficient to allow full 360° swivelling of said rear swivel castors.

9. A trolley according to claim 1, wherein the forward offset of the main upper portion of the upright support structure relative to the mounting positions of the rear wheel elements corresponds substantially with the forward projection of the interconnecting portion of the base chassis.

10. A trolley according to claim 1, wherein said push-handle assembly incorporates a manually controlled brake element, and wherein there is provided a brake linkage for coupling movement of the brake element through said upright support structure to said rear wheel elements, each of which includes a braking device.

11. A trolley according to claim 6, wherein said push-handle assembly incorporates a manually controlled brake element, and wherein there is provided a brake linkage for coupling movement of the brake element through said tubular members to said rear wheel element, each of which includes a braking device.

12. A trolley according to claim 11, wherein said upright support structure includes a forwardly projecting, inclined intermediate portion between said base portion and said main upper portion, to form the forward offset, said supplementary load receptacle lying above said intermediate portion, and wherein said brake linkage comprises, in respect of each rear wheel element, a straight brake rod coupled to the brake element and extending vertically through an upper portion of the respective said upright tubular member, and projecting out of said tubular member in the region of an intermediate offsetting portion thereof, and a coupling member projecting rearwardly from the lower end of said brake rod into the base part of said tubular member where it couples to said braking device of the wheel element.

13. A trolley according to claim 1, wherein said push-handle assembly comprises a push handle which includes a horizontal center cross-bar portion and two opposite side portions projecting forwardly and upwardly from opposite ends of the center cross-bar portion to provide for a double pistol-grip holding action by the user, the forward, upper ends of said side portions being connected to opposite sides of the top of the upright support structure.

14. A trolley according to claim 13, wherein said handle assembly also comprises a pivotable brake handle shaped correspondingly to the push handle and pivotally mounted to said push handle forwardly of said side portions thereof so to be selectively actuable by gripping a central portion thereof toward the centre cross-bar portion of the push handle, or by gripping opposite side portions thereof toward the side portions of the push handle.

15. A trolley comprising a base chassis having a load support platform and a set of ground-contacting wheel elements which include a pair of rear wheel elements and an upright support structure fixed to and projecting upwardly from a rear portion of the base chassis and surmounted by a push-handle assembly, the load support platform being forwardly and upwardly inclined to permit the trolley to be nested with other identical trolleys so that in the nested position said platform will overlap with the platform of the trolley in front, the base chassis including an interconnecting portion connected to the upright support structure immediately above the rear wheel elements at a first position or positions disposed at a first level, and to the rear of the load support platform at one or more second positions disposed forwardly of the first position or positions at a second level, said second level being lower than the first level.

16. A trolley according to claim 15, wherein said rear wheel elements comprise swivel castors, the space beneath said interconnecting portion being sufficient to allow full 360° swivelling of said rear swivel castors.

17. A trolley comprising a base chassis which includes a load support platform and a set of ground-contacting wheel elements, an upright support structure fixed to and projecting upwardly from a rear portion of said base chassis, a push-handle assembly mounted in the region of the upper end of the upright support structure and incorporating a manually controlled brake element, and an upwardly open supplementary load receptacle mounted on said support structure above the level of the platform, wherein:

a) said set of ground-contacting wheel elements includes a pair of rear wheel elements mounted at respective opposite sides of said rear portion of the base chassis;

b) said upright support structure includes a base portion, a main upper portion which is offset forwardly relative to said base portion and a forwardly projecting, inclined intermediate portion between said base portion and said main upper portion, to form the forward offset, said upright support structure being formed from a pair of upright tubular members attached to said rear portion of said base chassis at opposite sides thereof, said pair of rear wheel elements being mounted to base parts of the respective said upright tubular members;

c) said rear wheel elements are mounted at respective mounting positions to said base portion of said upright support structure;

d) said main upper portion defines the rear limit to which the load support platform may be loaded, said rear limit lying forwardly of the mounting positions of said rear wheel elements;

e) said load support platform is upwardly inclined in the forward direction to permit the trolley to be nested with other identical trolleys so that in the nested position said platform will overlap with the platform of the trolley in front;

f) said supplementary load receptacle is mounted on the rear side of said main upper portion of said upright support structure above said intermediate portion, and wherein g) there is provided a brake linkage for coupling movement of the brake element through said tubular members to said rear wheel elements, each of which includes a braking device, said brake linkage comprising, in respect of each rear wheel element, a straight brake rod coupled to the brake element and extending vertically through an upper portion of the respective said upright tubular member, and projecting out of said upright tubular member in the region of said intermediate offsetting portion thereof, and a coupling member projecting rearwardly from the lower end of said brake rod into the base part of said tubular member where it couples to said braking device of the wheel element.

18. A trolley comprising a base chassis which includes a load support platform and a set of ground-contacting wheel elements, an upright support structure fixed to and projecting upwardly from a rear portion of said base chassis, a push-handle assembly mounted in the region of the upper end of the upright support structure, and an upwardly open supplementary load receptacle mounted on said support structure above the level of the platform, wherein:

a) said set of ground-contacting wheel elements includes a pair of rear wheel elements mounted at respective opposite sides of said rear portion of the base chassis;

b) said upright support structure includes a base portion and a main upper portion which is offset forwardly relative to said base portion;

c) said rear wheel elements are mounted at respective mounting positions to said base portion of said upright support structure;

d) said main upper portion defines the rear limit to which the load support platform may be loaded, said rear limit lying forwardly of the mounting positions of said rear wheel elements;

e) said load support platform is upwardly inclined in the forward direction to permit the trolley to be nested with other identical trolleys so that in the nested position said platform will overlap with the platform of the trolley in front;

f) said supplementary load receptacle is mounted on the rear side of said main upper portion of said upright support structure; and wherein g) said push-handle assembly comprises a push handle which includes a horizontal centre cross-bar portion and two opposite side portions projecting forwardly and upwardly from opposite ends of the centre cross-bar portion to provide for a double pistol-grip holding action by the user, the forward, upper ends of said side portions being connected to opposite sides of the top of the upright support structure, and a pivotable brake handle shaped correspondingly to the push handle and pivotally mounted to said push handle forwardly of said side portions thereof so to be selectively actuable by gripping a central portion thereof toward the centre cross-bar portion of the push handle, or by gripping opposite side portions thereof toward the side portions of the push handle.

* * * * *